April 3, 1956     L. BUEHLER, JR     2,740,269
TANK CONSTRUCTION FOR COOLING LIQUIDS
Filed May 11, 1954     3 Sheets-Sheet 1
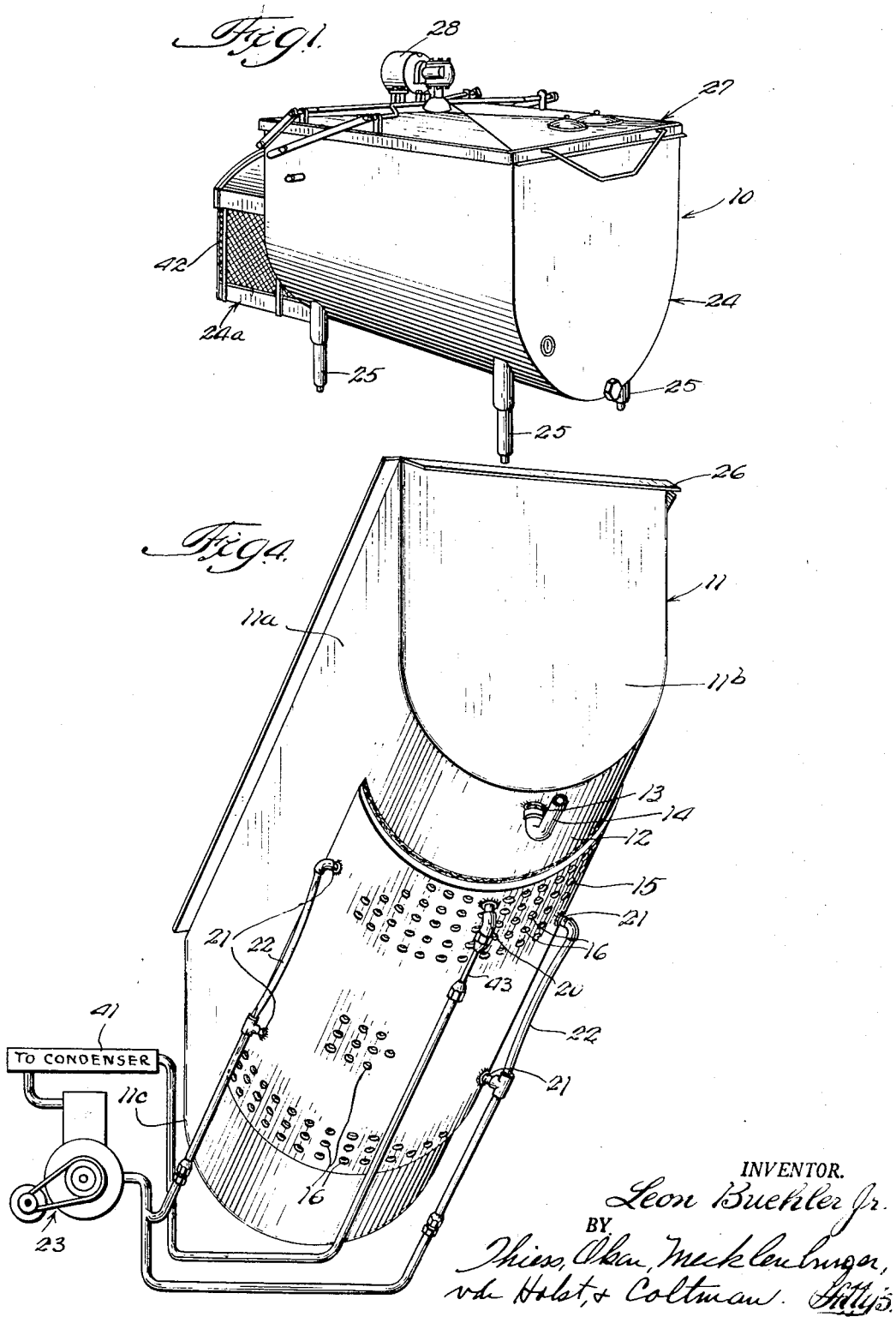
INVENTOR.
Leon Buehler Jr.
BY
Thiess, Olsen, Mecklenburger,
van Holst, & Coltman.

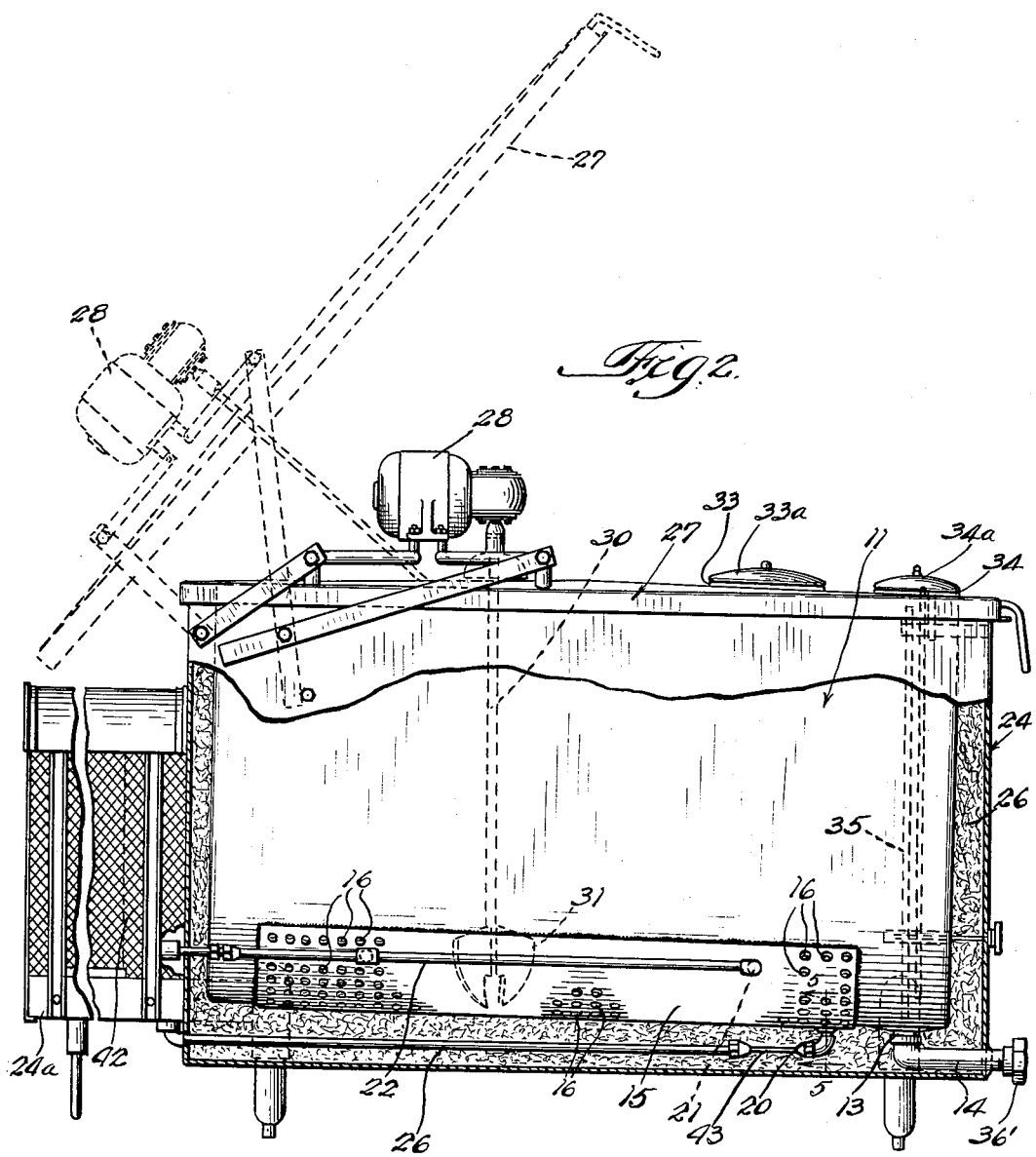

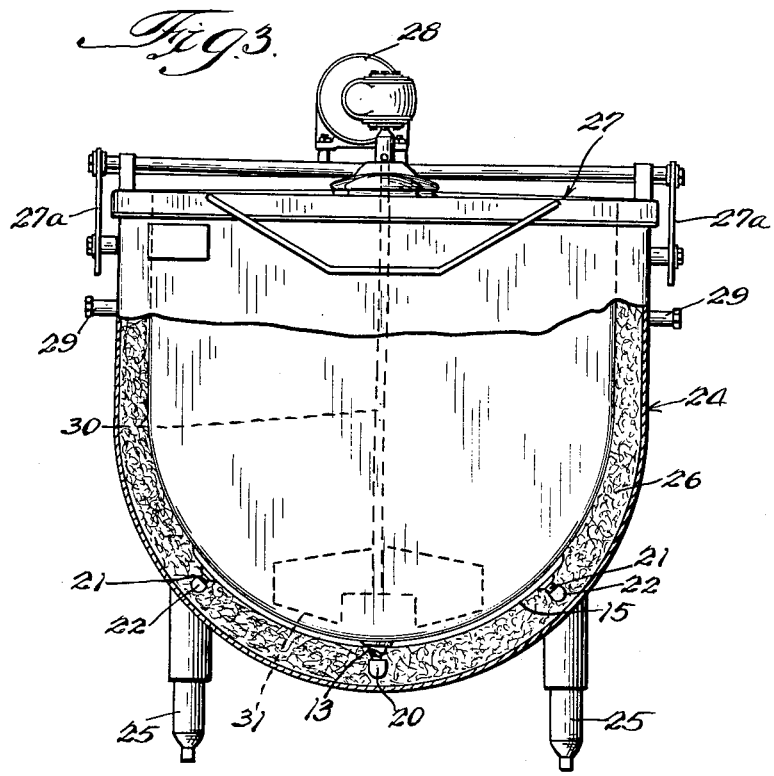
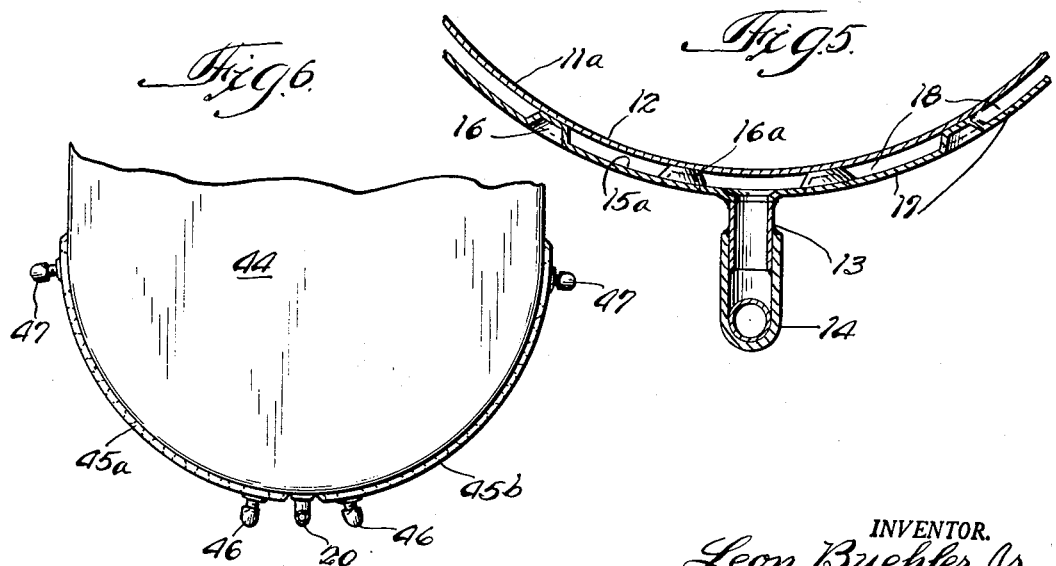

United States Patent Office 2,740,269
Patented Apr. 3, 1956

2,740,269

TANK CONSTRUCTION FOR COOLING LIQUIDS

Leon Buehler, Jr., Evanston, Ill., assignor to The Creamery Package Mfg. Company, Chicago, Ill., a corporation of Illinois Application May 11, 1954, Serial No. 429,084

6 Claims. (Cl. 62—141)

This invention relates to a tank construction for use in the storage and cooling of liquids, such as milk or the like, and more particularly to a refrigerating system forming a part of said tank.

In the dairy industry, for example, it has become the custom among farmers to store fresh milk in conventional milk cans or containers between periods when the milk is to be collected for transporting to the processing plant. Because of the perishable nature of fresh milk, it is necessary that the milk be properly cooled while awaiting such collection. The practice followed by farmers in temporarily storing the milk is to partially submerge the filled cans in a vat, tub, or the like through which cool water is circulated continuously. Because of the difficulty oftentimes experienced in obtaining an adequate water supply, in maintaining continuous circulation of the cooling water, and in the limited capacity of the farmer to handle only a predetermined number of these cans during any given period, this customary practice is beset with many shortcomings. As a result of these shortcomings, it is necessary that the stored fresh milk normally be collected daily from the farmer. In addition to the aforenoted shortcomings associated with the above indicated practice, there are further disadvantages to be found; for example, the farmer must exercise care to insure that the interior of each of the cans be properly cleaned in accordance with established sanitary standards before the cans are filled with the fresh milk so that no foreign matter remains within the cans which would have a deleterious effect on the milk. This operation, as is apparent, requires considerable time and effort on the part of the farmer. Furthermore, handling of the filled cans oftentimes becomes a laborious task for the farmer particularly where a large volume of fresh milk is being produced.

To overcome the problems associated with the aforementioned practice of storing and cooling fresh milk, a novel tank construction is provided which is adapted to effectively accommodate varying quantities of fresh milk and at the same time maintain the latter at a constant predetermined temperature for prolonged periods of time. By reason of the fact that the milk may be maintained at such predetermined temperature, the milk is not readily susceptible to spoliation and therefore the time between collections may be substantially lengthened or varied without adversely affecting the quality of the milk or interfering with the milking schedule of the farmer. The capacity of the tank to be utilized by the farmer will depend upon the quantity of fresh milk daily produced during peak seasons of the year and the maximum time which will elapse between collections.

The improved tank construction is provided with a novel refrigerating system which is capable of withstanding extreme temperature variations without damaging or impairing proper operation of the system. This is an essential requirement of tanks of this type because of the fact that the interior of such a tank must be periodically cleaned or washed out in accordance with public health regulations and such cleaning operation is normally accomplished by the use of hot water which might cause a sudden and high pressure to develop within the system. Because of the fact that the tank is provided with a removable cover, the whole interior thereof is readily accessible for cleaning by the farmer and may be accomplished in a relatively short period of time with but a minimum of effort.

In addition to the refrigerating system being capable of withstanding extreme temperature variations, it must also be of such refrigerating capacity as to effectively and expeditiously cool quantities of milk which might vary over a wide range in a given period of time so as to inhibit bacteria growth.

The improved tank construction enables the farmer, if he so desires, to pump fresh milk directly from the milking machine to the interior of the tank for storing and cooling therein and then to pump the cooled milk directly from the tank to the pickup truck through suitable conduits when collection is made, thereby eliminating entirely any manual handling of the milk by the farmer.

The over-all effect of the improved tank construction, particularly as it relates to the dairy farmer, is that it enables varying quantities of fresh milk to be handled in a simple, more efficient and expeditious manner.

Further advantages associated with the improved tank construction will become apparent from the description, accompanying drawings, and appended claims.

In accordance with one embodiment of this invention, a tank construction is provided which comprises a reservoir of predetermined volumetric capacity which is adapted to receive, store, and maintain, at a constant temperature, liquid, the quantity of which might vary widely. The reservoir has an open upper side provided with a removable cover to permit access to the interior thereof for cleaning. Subtending and secured to the underside of the reservoir is a jacket having portions thereof spaced therefrom to form an evaporator cavity or chamber through which a volatile refrigerant is caused to circulate. The jacket is preferably formed of a durable sheet material which is shaped to conform substantially to the contour of a portion of the underside of the reservoir which is subtended thereby. The jacket is provided with a plurality of spaced bosses or protuberances which are adapted to contact the underside of the reservoir and maintain the unembossed portions thereof in proper spaced relation with respect to the underside of the reservoir to provide an evaporator cavity. The underside portion of the reservoir, subtended by the jacket, is formed of an effective thermal conductive material. An intake port is provided adjacent the lowermost portion of the jacket for permitting the introduction of the volatile refrigerant under pressure and in a mixture of liquid and gaseous states into the cavity. The intake port communicates with a condenser which forms a part of the refrigerating system for the improved tank construction. The remainder of the refrigerating system, which is preferably a hermetically sealed unit, includes a compressor of a given piston displacement. The suction side of the compressor is in communication with a plurality of discharge ports formed along the uppermost side of the jacket, and in elevated relation with respect to the intake port. By reason of the relative positioning of the intake and discharge ports, the refrigerant, which, during circulation through the cavity is converted into a gaseous state, may be more readily removed or withdrawn from the cavity with the result that greater wetting of the jacketed underside portion of the reservoir with liquid refrigerant is accomplished and thereby a greater cooling effect is produced by the refrigerant. In addition, included within and forming a part of the refrigerating system is a capillary tube having a passageway of fixed dimensions which is positioned intermediate the condenser and intake port of the jacket. The capillary tube functions as a restrictor and correctly meters the rate of flow of refrigerant into the cavity. A further advantage to be derived from the use of a capillary tube having an open passageway of fixed dimensions is that it provides a means for relieving any high pressure which might develop within the cavity due to sudden expansion of the refrigerant, particularly, if some liquid refrigerant still remained within the cavity at the time cleaning out of the interior of the reservoir with hot water occurred. Such pressure relief is accomplished by temporarily allowing feedback of the expanded refrigerant through the center bore into the high pressure side of the refrigerating system or in other words, effecting reverse flow of the expanded refrigerant in the system without damaging any part thereof. Thus, the capillary tube functions automatically as a safety when such high pressure conditions arise. The balance between the various elements of the refrigerating system such as the volumetric capacity of the cavity, the piston displacement of the compressor, and the area of the underside of the reservoir subtended by the jacket are factors of utmost importance to be considered in attaining satisfactory operation of the cooling system, even under widely variable load conditions. It is this balance or proportional relation of these factors in the system which is considered the crux of novelty in the tank construction.

For a more complete understanding of this invention, reference should be made to the drawings wherein:

Figure 1 is a perspective view of the improved tank construction;

Fig. 2 is an enlarged side elevational view of the tank construction with a portion of the outside shell cut away to expose a part of the underside of the reservoir;

Fig. 3 is a right end view of the tank construction shown in Fig. 2;

Fig. 4 is a fragmentary perspective view of the reservoir showing the relative position of the jacket attached to the underside thereof, and the compressor, condenser, and capillary tube for the jacket;

Fig. 5 is an enlarged fragmentary sectional view taken along line 5—5 of Fig. 2; and Fig. 6 is a fragmentary end view of a modified form of reservoir.

Referring now to the drawings and more particularly to Fig. 1, an improved tank construction 10 is shown for use in a manner similar to that heretofore discussed. The tank 10 includes a reservoir 11 which is adapted to accommodate a given quantity of liquid. The reservoir, in this instance, is provided with a smooth interior surface and includes a center section 11a which is substantially U-shaped in cross section, and upwardly extending end plates 11b and 11c secured by welding or any other suitable means to the opposite ends of the center section. The bottom or bight portion 12 of the center section 11a of the reservoir is inclined toward the front or end plate 11b of the tank, as seen in Fig. 2, so that all of the liquid may be readily drained from the reservoir through an outlet port 13 formed adjacent plate 11b. The port is fitted with suitable pipe fittings 14 to permit the liquid to be withdrawn from the front side of the tank construction.

A portion of the underside of reservoir center section 11a is subtended by and has secured thereto by welding or any other suitable means, a jacket 15 formed of sheet material which is shaped to conform to the contour of the underside. The jacket 15, in this instance, is shown to be provided with a plurality of spaced dimples or indentations 16 which, on the inner surface 15a of the jacket, see Fig. 5, form bosses or stays 16a which are adapted to contact the underside of the reservoir. The unindented portions 17 of the jacket, intermediate the bosses 16a, are spaced a predetermined distance from the underside of the reservoir and form a plurality of interconnected passageways which, in turn, form a cavity or chamber 18, the purpose of which will be discussed more fully hereinafter. While the jacket sheet material is shown as dimpled, it is to be understood, of course, that the sheet material may be unindented so long as it is structurally strong enough to withstand the pressure developed with the formed cavity. The opposite side portions of the jacket extend part way up the upwardly extending sides of the reservoir center section 11a. Formed in the lowermost part of jacket 15 is an intake port or header 20. The port is provided to permit liquid refrigerant under pressure to be introduced into cavity 18. Formed in the upwardly extending opposite side portions of the jacket are sets of spaced outlet or suction ports 21. The ports 21 of each set are interconnected to one another by suitable pipe fittings 22 which communicate with the suction side of a compressor 23. The compressor forms a part of the tank refrigerating system which will be discussed more fully hereinafter.

The reservoir 11, including the jacket 15 secured thereto, is encased within an outer body member or shell 24, which is supported by a plurality of depending vertically adjustable legs 25. Intermediate the reservoir 11 and shell 24 is a liner 26 of heat insulation material. As noted in Figs. 2 and 3, the liner covers the outside surfaces of the center section 11a, end plates 11b and 11c, jacket 15, the intake and outlet ports 20 and 21, respectively, and the pipe fittings associated therewith. Thus, the heat absorbed by the refrigerant circulating in cavity 18 is derived entirely from the liquid stored within the reservoir and none from the ambient temperature of the shell 24.

The top edge of the reservoir 11 is bent outwardly and downwardly to form a peripheral flange 26 which is welded, or otherwise secured, to the upper edge of shell 24. The flange 26 permits ready draining of any liquid or condensate, which might form thereon.

Hingedly connected to the upper portion of shell 24 is a cover 27 which is adapted to close off the open upper side of the reservoir. Arms 27a, disposed on opposite sides of the cover and forming a part of the hinge connection therefor, are provided with extensions which are adapted to contact protruding stops 29 extending from opposite sides of jacket 24. The stops limit the extent to which the cover can be raised.

Mounted in a fixed position on the upper side of cover 27 is an electric motor 28. Extending downwardly through the cover and at substantially a right angle from the shaft of the motor is an agitator shaft 30. The lower or free end of the shaft terminates in a paddle 31 which is disposed adjacent to but not in contact with the bottom of the reservoir and is adapted to effect stirring of the liquid contained within the rservoir, thereby resulting in greater heat loss of the liquid to the refrigerant circulating through evaporator cavity 18. The agitation produced by the paddle 31 must not be violent enough, when milk is being stored in the reservoir, so as to cause separation of the fats of the milk.

A handle 32 is provided at the front end of cover 27 for facilitating opening and closing thereof. As will be seen in dotted lines in Fig. 2, the cover 27, when raised, is completely out of contact with any portion of the reservoir and also is out of the way, thereby providing ready access of the reservoir interior by the farmer for cleaning thereof. The cover 27 is also provided with a pair of spaced openings 33 and 34 having removable lids 33a and 34a, respectively, therefor. Opening 33 is provided to enable the farmer, if he so desires, to manually pour the fresh milk into the reservoir without requiring the entire cover 27 being raised. Where the fresh milk is to be pumped directly from a milking machine, not shown, to the tank, a suitable conduit is provided which is adapted to be accommodated by opening 33. In such a situation, the farmer is relieved of any manual handling of the milk produced and thereby expedites the milking operation.

The second opening 34 formed in cover 27, affords access to a control valve 35 which is disposed within the interior of the reservoir and is adapted to regulate the flow of milk out through port 13. The valve 35, in this instance, is a raisable plug type and has an elongated shaft 36 which extends upwardly within the interior of the tank. Mounted transversely and disposed adjacent the upper end of shaft 36 is a cross pin, not shown, which cooperates with the bifurcated end 37 of an inwardly extending stud 38 to hold the valve in either open or closed position. The stud 38 is affixed to the inside surface of end plate 11b. Also adjustably mounted on stud 38 is an elongated removable gauge rod 40 which is disposed in spaced substantially parallel relation with respect to the valve shaft 36. Rod 40 is calibrated through substantially its entire length thereby enabling the farmer to readily ascertain the volume of the liquid contained within the tank at any given time by observing the wetted portion of the rod.

The improved refrigerating system includes, in addition to the compressor 23, a condenser 41 which communicates with the high pressure side of the compressor 23. Condenser 41 and compressor 23, in this instance, are disposed within an enlarged housing 42 which is carried on a rearwardly extending portion 24a of the shell 24. Positioned intermediate the output side of condenser 41 and intake port 20 for evaporator cavity 18 is a capillary tube 43 having a restricted passageway formed therein through which the refrigerant in a liquid state is forced to flow. The function of the tube 43 to control the feed of the liquid refrigerant into cavity 18 is believed well understood by those skilled in the art.

While a water-cooled condenser may be used in this refrigerating system, it might be more advantageous to employ an air-cooled type which is not dependent upon an adequate water supply inasmuch as water oftentimes is a problem to obtain particularly on a farm. In addition, there frequently arises a problem of scale deposits on the condensing surface of the water-cooled condenser which increases materially the danger of freeze-up during the winter and results in damage to the unit. Inasmuch as such tank constructions are likely to be used throughout the entire country, the refrigerating system must be capable of operating satisfactorily under extreme temperature variations. In addition, the motor, for driving the compressor, must be capable of operating satisfactorily under voltage variations of approximately 10 per cent.

It is extremely desirable costwise, as heretofore mentioned, to employ a commercially available type of compressor with a minimum power input and where the electric driving motor therefor is sealed within the compressor casing and is directly connected to the compressor crank shaft. With such an arrangement, the compressor operates at full motor speed and no speed change to alter the power requirements therefor is possible. Motor compressors of this type and associated condensers are occasionally subjected to extremely high ambient temperature conditions and are not ordinarily designed to operate at a refrigerant temperature in the evaporator much in excess of 50° F.

It is possible to limit the refrigerant evaporator temperature by use of a pressure limiting thermal expansion valve, not shown, which automatically shuts off when the evaporator temperature or pressure goes beyond a predetermined high, or by use of a diaphragm actuated valve, also not shown, in the suction line between the evaporator chamber and the compressor to limit the downstream pressure to a safe figure. In the interest, however, of economy, simplicity, and reliability, it is undesirable to employ such automatic valves because of their numerous moving parts and their susceptibility to excessive wear and the difficulty of maintaining such parts in proper operating condition.

The capillary tube 40, as heretofore mentioned, is simply a restrictor having a passageway of fixed dimensions and is disposed between the condenser and evaporator cavity. There is no means for adjusting the size of the tube passageway and thus no control of the evaporator pressure is obtainable. As an alternative, therefore, to prevent the pressure within the evaporator cavity or chamber 18 from reaching too high a value so that the motor will no longer pull the load, it is essential to limit the amount of cooling surface and the volumetric size of the evaporator cavity so that the operating refrigerant temperature and pressure will not exceed a given point.

The application of a capillary tube type of refrigerant control in domestic refrigerators, deep freeze units, and small air conditioners is well known. In such installations the liquid refrigerant is fed in at a high point with respect to the evaporator chamber and the gaseous refrigerant removed from the bottom side of said chamber. In other words, at the outlet of the evaporator chamber, all of the liquid refrigerant must have been substantially evaporated and as a consequence, the surfaces, defining the evaporator chamber adjacent the outlet port, will be practically dry or void of liquid refrigerant. It is a well known fact that only wetted heat transfer surfaces will produce a satisfactory cooling effect; in other words, those portions of the transfer surface which are in contact with a vapor or gaseous refrigerant produce little or no cooling effect. However, in the aforenoted applications of a capillary tube control, the heat transfer rate to the surrounding atmosphere or to the product in contact with the surface is relatively low and therefore the evaporator tubes, due to the conduction of the tube wall, become relatively cool uniformly. By way of contrast, however, in applicant's tank construction, only that portion of the bottom side 12 of the reservoir 11, which is subtended by the jacket 15, forms a part of the evaporator cavity 18 and is in thermal conductive relation with the liquid cooled within the reservoir. None of the jacket 15 is in direct contact with the liquid being cooled and therefore, from a heat transfer viewpoint, serves no useful purpose. The fin effect produced by the dimples 16, formed in jacket 15, in effecting heat dissipation for the reservoir 11, is for all practical purposes negligible because of the very high heat transfer rate attained by evaporator chamber 18 and the relatively small cross sectional area of the dimples themselves. It can be seen, therefore, that it is necessary, in order to provide an efficient cooling system, that as large a proportion of the underside of the reservoir, enclosed by the jacket 15, be contacted or wetted with liquid refrigerant. Inasmuch as the jacket 15 subtends the bight portion of the reservoir, a considerable segment of the heat transfer surface of the reservoir will form the top wall of the evaporator chamber, except where the sides of the jacket are turned upwardly. As the gaseous refrigerant is lighter in weight than the liquid refrigerant, the former will rise above the liquid and contact the underside of the reservoir. As heretofore pointed out, the gaseous refrigerant produces little cooling effect to the surface to which it comes in contact with and therefore it is of importance to remove from the cavity 18 such gaseous refrigerant as quickly as possible. This removal can be effectively accomplished by causing a relatively high velocity refrigerant to circulate through the evaporator chamber 18 and sweep across the underside of the reservoir so as to carry the bubbles formed by the gaseous refrigerant toward the suction ports 21 and, in turn, cause liquid refrigerant to be brought into contact with the reservoir surface.

If liquid refrigerant was fed into the upper portion of the evaporator chamber 18 and the evaporated or gaseous refrigerant removed from the bottom portion of the chamber in the conventional manner, heretofore discussed, it would be virtually impossible to wet substantially any portion of the underside of the reservoir particularly in the vicinity of the outlet port, because what little liquid refrigerant might be present at that point would be disposed along and in contact with the surface of the jacket. It is therefore necessary in the improved refrigerating system to reverse the normal flow of the liquid refrigerant through the evaporator chamber.

Those skilled in the art are familiar with the fact that when using a Freon refrigerant, there is the likelihood that the evaporator chamber will become loaded with oil from the compressor after the system has been in operation only a short time and therefore, because of this fact, the infeed or intake header is usually disposed at the top of the evaporator chamber and the suction or outlet headers disposed adjacent the bottom thereof so that the oil accumulated within the chamber will flow out by gravity. Where the relative positions of the intake and suction headers are reversed, it is possible by use of high velocity vaporized refrigerant to carry the accumulated oil along with the vapor and raise the oil to the suction headers 21 so that a part of the oil will be withdrawn through the suction header or port.

By reason of the evaporator chamber or cavity 18 being formed of a plurality of interconnected flow passages, it is important that the dimensions of the cavity be such as to prevent the possibility of certain segments of the cavity being short-circuited due to the refrigerant velocity being too high so that such segments become starved of the liquid refrigerant. If such occurs, non-uniform cooling results which reduces the over-all efficiency of the refrigerating system.

Where the liquid to be cooled and stored in the reservoir is milk, the latter is normally cooled to approximately 38° or 40° F., in other words, an approach of within six or eight degrees of the freezing point. Under this condition of operation, the evaporating temperature of the refrigerant will be very much lower than under the high temperature condition; and, of course, will depend upon the efficiency and area of cooling surface. If the refrigerant temperature gets too low, portions of the milk will freeze on the surface of the reservoir adjacent the bight portion 12 which is very undesirable. It is, therefore, necessary to proved a sufficient cooling surface for the reservoir to prevent this happening and it can, therefore, be seen that a compromise is necessary between the low temperature and high temperature operating condition.

Mention has previously been made regarding periodic cleaning out of the tank reservoir and that warm, or even hot, water normally is employed. Obviously, if there is any liquid refrigerant in the evaporator when this warm water is put into the reservoir, the temperature and pressure will be raised to the boiling point. For example, at 140° F. "Freon–12" (dichlorodifluoromethane $CCl_2F_2$) has a pressure of 205 p. s. i. g., and "Freon–22" (monochlorodifluoromethane $CHClF_2$) has a pressure of 338 p. s. i. g. With still higher temperatures, these pressures increase very rapidly. It is economically not feasible therefore to construct these cooling jackets from heavy gauge materials to safely withstand such high operating pressures. Other means, therefore, must be utilized for coping with these operating extremes. One such means would be to remove all of the liquid refrigerant from within the cavity 18 before applying the hot water. This might be done, for example, by closing a valve, not shown, disposed between the condenser and the evaporator chamber and operating the compressor until all of the liquid refrigerant has been evaporated and has been pumped over into the high side of the refrigerating system. Such a valve, in all probability, would have to be automatic in operation and would be undesirable because of unduly complicating and increasing the cost of the system and being a potential source of trouble. Furthermore, it would be impossible, or at least extremely difficult, to foretell when hot water was to be poured into the reservoir, and thus, the effectiveness of this means is clearly in doubt.

Another possible means of solving the matter of high pressure within the cavity 18 is to see that water used is not hotter than 115° F., which, in turn, would give about 150 pounds pressure with "Freon-12" and such pressure could be safely handled by a cooling jacket made of standard gauge sheet material. But here, again, the human element is the controlling factor which, of course, is not always reliable. To overcome this human factor, a pressure relief valve could be installed which would open when the internal pressure in the system reached a predetermined limit. Such a pressure relief valve, however, is beset with numerous shortcomings such as cost and leakage. Furthermore, if the relief valve opens to protect the system, it means an immediate service call, for a number of reasons. First, relief valves of this type cannot be relied upon to properly reseat themselves or close absolutely tight once they have opened and a service man must, therefore, either regrind the valve or replace it with a new one. In the second place, the opening of the relief valve has probably blown out so much of the refrigerant that there isn't enough left in the system for proper operation thereof. It can be seen, therefore, that this means of coping with the hot water clean-out operation is not at all satisfactory.

When a capillary tube 43 is employed, feeding into the low point of the evaporator cavity 18, there can be flow of refrigerant in either direction. Of course, the flow will always be from the high pressure point to the low pressure point. Now, if hot water is suddenly poured into the reservoir, while liquid refrigerant is still within the evaporator cavity, the pressure in the cavity is very rapidly built up until it exceeds the pressure in the condenser or high pressure side of the system whereupon the flow reverses through the capillary tube and the evaporator cavity is quickly emptied of liquid refrigerant. There must, of course, be sufficient volumetric capacity in the high side of the refrigerating system to accommodate all of the liquid refrigerant discharged from the cavity during this operation. The evaporator cavity will empty itself in this manner, regardless of whether the compressor 23 is in operation or not. The protection, therefore, is positive—completely automatic, without the human element entering into it at all, and it is accomplished without the use of any automatic equipment having moving parts which might be subject to failure. The capillary tube control simply depends upon flow through a wide open passageway and therefore requires no extra equipment beyond what is needed for the normal functioning of the refrigerating system and therefore is so safe and positive, and foolproof that a relief valve is no longer needed to protect the cooling jacket against explosion or sudden pressure rise. It does require, however, that the volume of the evaporator cavity be smaller than the volume of the high side of the refrigerating system.

By employing a completely hermetically sealed motor compressor, and a capillary tube, it is possible to have a minimum number of joints all of which can be welded or silver-soldered. Also, there is no need for any shut-off valves in the entire refrigerating system, thus eliminating the need for stuffing boxes or diaphragms. In other words, all joints can be of the very highest reliability and the entire refrigerating system can be hermetically sealed, thus reducing the chances of refrigerating leakage to the very minimum.

As already pointed out, such a system is, however, very difficult to bring into proper operating balance with commercially available compressors to cover the very wide range of operating conditions encountered in this service. It has been determined, therefore, that when "Freon–12" is employed as the refrigerant, such a balance exists only when there is the following ratios with respect to the compressor piston displacement; approximately one square foot of cooling surface in the evaporator cavity for each cubic foot per minute of compressor piston displacement, and when the internal volume of the evaporator cavity including the inlet and outlet headers thereof is approximately .01 cubic feet per cubic foot per minute of compressor piston displacement. When on the other hand, "Freon-22" is to be used as the refrigerant, satisfactory operation results only when the evaporator has approximately 2.1 square feet of surface per cubic foot per minute of compressor piston displacement and when the volume of the evaporator cavity with its headers is approximately .015 cubic feet per cubic foot per minute compressor piston displacement. Allowing a tolerance of 25 per cent plus or minus in these ratios, we would then have, for "Freon-12," a range of .75 to 1.25 square feet of cooling surface per cubic foot per minute compressor piston displacement together with a range of .0075 to .0125 cubic feet of evaporator cavity volume per cubic foot per minute compressor piston displacement; and for "Freon-22" a range from 1.57 to 2.62 square feet of cooling surface per cubic foot per minute compressor piston displacement together with an evaporator cavity volume of .01125 to .01875 cubic feet per cubic foot per minute compressor piston displacement.

Where the volumetric capacity of the reservoir is considerably larger than that of reservoir 11, heretofore described, a modified form of reservoir 44, as seen in Fig. 6, may be utilized wherein a pair of cooling jackets 45b and 45a are secured by welding or any other suitable means to a portion of the underside of the reservoir. Each of the jackets, in this instance, is formed of dimpled sheet material, similar to jacket 15, and provides an evaporator cavity consisting of a plurality of interconnected sinuous passageways. Each jacket extends from approximately the center of the bight portion of the reservoir up the outside surface of one side of the reservoir. An intake port 46 is formed adjacent the lowermost edge of each jacket. The port 46 for each jacket is connected to a separate condenser, not shown. Likewise each jacket is provided with a suction port 47 or a pair of suction ports which are disposed adjacent the uppermost edge of the jacket. Port 47 of each jacket connects with the suction side of a compressor, not shown. It is preferable to use a separate compressor and condenser for each jacket 45a or 45b, because of the savings in cost over the use of a single custom made compressor.

Thus, it will be seen that an improved storage and cooling tank construction has been provided which facilitates the handling of liquids, the quantity of which varies over a wide range. Furthermore, the improved tank construction is provided with a refrigerating system which is capable of withstanding extreme temperature variations without adversely affecting satisfactory operation thereof. The refrigerating system is simple in construction and requires little or no service or maintenance thereof.

While several embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A tank construction for storing and cooling liquids, comprising a reservoir of predetermined volumetric capacity, a cooling jacket subtending and being secured to a predetermined area of the underside of said reservoir to form an evaporator cavity therebetween, said jacket having an inlet port formed adjacent the lowermost portion thereof and an outlet port formed adjacent the uppermost portion thereof, both of said ports communicating with said evaporator cavity, a compressor, employing dichlorodifluoromethane as a refrigerant, having the suction side thereof communicating with said outlet port to effect circulation of said refrigerant through said evaporator cavity, a condenser communicating with the high pressure side of said compressor and said inlet port, and a capillary tube communicating with and disposed intermediate said condenser and said inlet port; said reservoir having between .75 and 1.25 square feet of the underside thereof subtended by said jacket and said evaporator cavity having an internal volume of .0075 to .0125 cubic feet for each cubic foot per minute of compressor piston displacement.

2. The tank construction recited in claim 1 wherein monochlorodifluoromethane is substituted for dichlorodifluoromethane as a refrigerant and said reservoir has between 1.57 and 2.62 square feet of the underside thereof subtended by said jacket and said evaporator cavity has an internal volume of .01125 to .01875 cubic feet for each cubic foot per minute of compressor piston displacement.

3. A tank construction for storing and cooling liquids, comprising a reservoir of predetermined volumetric capacity, a cooling jacket, formed of sheet material spaced from being and secured to a predetermined highly thermal conductive portion of the underside of said reservoir to form an evaporator cavity therebetween through which a volatile refrigerant circulates, said jacket being provided with an inlet port adjacent the lowermost portion thereof and an outlet port adjacent the uppermost portion thereof, a capillary tube of fixed dimension disposed adjacent to and in communication with said inlet port to permit flow of said refrigerant normally in one direction into said cavity and in an opposite direction when a sudden high temperature differential occurs on opposite sides of the thermal conductive portion of said reservoir to which said jacket is secured, a compressor having the suction side thereof communicating with said outlet port to effect circulation of said refrigerant through said evaporator cavity, and a condenser communicating with the high pressure side of said compressor and said capillary tube, said condenser in combination with said capillary tube communicating therewith being of such volumetric capacity as to absorb the reverse flow of all said refrigerant when said sudden high temperature differential occurs.

4. A tank construction for storing and cooling liquids, comprising a reservoir of predetermined volumetric capacity having the upper side thereof provided with a removable cover and a discharge valve disposed adjacent the lowermost portion of said reservoir to permit drainage of the liquids held within said reservoir, a power actuated agitator extending transversely from said cover for projecting into and terminating adjacent to but not in contact with the bottom of said reservoir, when said cover is overlying the upper side of said reservoir, a cooling jacket, formed of sheet material shaped to conform substantially to the underside of said reservoir, said jacket subtending and being secured to said reservoir underside and having the surface of said jacket adjacent said reservoir underside provided with a plurality of protuberances contacting said underside to form an evaporator cavity consisting of a plurality of interconnected passageways through which a volatile refrigerant is caused to circulate, said jacket being provided with an inlet port for said refrigerant in liquid state disposed adjacent the lowermost portion thereof and an outlet port for substantially vaporized refrigerant disposed adjacent the uppermost portion of said jacket, a capillary tube provided with a restricted passageway of fixed dimension communicating with said inlet port to permit flow of said refrigerant normally in one direction into said cavity and in an opposite direction when a sudden high temperature differential occurs on opposite sides of the portion of said reservoir underside subtended by said jacket, an insulating member encompassing said jacket, the remainder of the outer surface of said reservoir, and said capillary tube, a hermetically sealed motor driven compressor mounted on said tank construction adjacent said insulation member and having the suction side thereof communicating with said outlet port to effect circulation of said refrigerant through said evaporator cavity, and a condenser communicating with the high pressure side of said compressor and being in communication with said capillary tube and being of such capacity as to absorb the reverse flow of said refrigerant when said sudden high temperature differential occurs.

5. In a cooling and storage tank construction having a reservoir, a refrigerating system comprising an evaporator in thermal conductive relation with the reservoir and having an inlet port therefor formed adjacent the lowermost portion of the evaporator and an outlet port therefor adjacent the uppermost portion thereof, a compressor having the suction side thereof communicating with said outlet port for effecting circulation of a refrigerant through said evaporator, a condenser communicating with the high pressure side of said compressor and the inlet port for said evaporator, and a capillary tube of fixed dimensions communicating with and disposed intermediate said condenser and said inlet port; when dichlorodifluoromethane is employed as a refrigerant, between .75 and 1.25 square feet of the surface of the reservoir in thermal conductive relation with the evaporator and between .0075 and .0125 cubic feet of the internal volume of the evaporator is provided for each cubic foot per minute piston displacement of said compressor.

6. The refrigerating system recited in claim 5 wherein monochlorodifluoromethane is substituted for dichlorodifluoromethane as a refrigerant, between 1.57 and 2.62 square feet of the reservoir surface in thermal conductive relation with the evaporator and between .01125 to .01875 cubic feet of the internal volume of the evaporator is provided for each cubic foot per minute piston displacement of the compressor.

References Cited in the file of this patent

UNITED STATES PATENTS

| | | |
|---|---|---|
| 2,186,900 | Dick | Jan. 9, 1940 |
| 2,266,134 | Wachowitz | Dec. 16, 1941 |
| 2,365,786 | Tull | Dec. 26, 1944 |
| 2,481,512 | Hubbell | Sept. 13, 1949 |
| 2,536,287 | Higgins | Jan. 2, 1951 |